(12) United States Patent
Hanna et al.

(10) Patent No.: US 9,325,631 B2
(45) Date of Patent: Apr. 26, 2016

(54) SYSTEM AND METHOD FOR IMPROVED UPSTREAM TRANSMISSION

(71) Applicants: STMicroelectronics, Inc., Coppell, TX (US); Cisco Technology, Inc., San Jose, CA (US)

(72) Inventors: Charaf Hanna, Lewisville, TX (US); Zhifang J. Ni, Plano, TX (US); John Wrobbel, Carrollton, TX (US); Benjamin Nelson Darby, Huntsville, AL (US); Andrew Graham Whitlow, Lewisville, TX (US); Gale L. Shallow, Johns Creek, GA (US); Maynard Darvel Hammond, Lawrenceville, GA (US)

(73) Assignees: STMICROELECTRONICS, INC., Coppell, TX (US); CISCO TECHNOLOGY, INC., San Jose, CA (US)

( * ) Notice: Subject to any disclaimer, the term of this patent is extended or adjusted under 35 U.S.C. 154(b) by 256 days.

(21) Appl. No.: 14/025,584

(22) Filed: Sep. 12, 2013

(65) Prior Publication Data

US 2015/0071302 A1 Mar. 12, 2015

Related U.S. Application Data

(60) Provisional application No. 61/874,948, filed on Sep. 6, 2013.

(51) Int. Cl.
*H04L 12/54* (2013.01)
*H04L 12/863* (2013.01)
(Continued)

(52) U.S. Cl.
CPC ........ *H04L 47/6215* (2013.01); *H04L 49/9057* (2013.01); *H04N 21/42676* (2013.01); *H04N 21/6168* (2013.01); *H04L 47/74* (2013.01); *H04N 21/61* (2013.01)

(58) Field of Classification Search
CPC . H04L 47/6215; H04L 49/9057; H04L 47/74; H04N 21/42676; H04N 2116/68; H04N 21/61; H04N 21/6168
See application file for complete search history.

(56) References Cited

U.S. PATENT DOCUMENTS

| 6,466,651 | B1 * | 10/2002 | Dailey | 379/37 |
| 6,504,846 | B1 * | 1/2003 | Yu et al. | 370/412 |

(Continued)

OTHER PUBLICATIONS

Krapp, "DOCSIS Per Sub Throughput Optimization," CED Magazine, Dec. 31, 2006, pp. 1-10.

*Primary Examiner* — Robert Wilson
(74) *Attorney, Agent, or Firm* — Allen, Dyer, Doppelt, Milbrath & Gilchrist, P.A.

(57) ABSTRACT

A system and method for improved upstream data transmission. In an embodiment, a cable modem includes a transceiver configured for transmitting data upstream once permission is granted. In between times when permission to transmit is granted, however, the cable modem is configured to prepare as much data as possible for immediate upstream transmission once that very permission is granted. Thus, prior to permission being granted, the cable modem assembles (pre-processes) the data into transmit frames such that the data frames may be stored in a local memory coupled to the transceiver in a "ready-to-go" format. In this manner, the entire amount of time/bandwidth allocated to the cable modem in response to its request for upstream data transmission may be dedicated to actually transmitting data upstream as opposed to consuming time and bandwidth processing the data into data frames after upstream data transmission has been granted.

27 Claims, 3 Drawing Sheets

(51) Int. Cl.
  *H04L 12/861* (2013.01)
  *H04N 21/426* (2011.01)
  *H04N 21/61* (2011.01)
  *H04L 12/911* (2013.01)

(56) References Cited

U.S. PATENT DOCUMENTS

| | | | |
|---|---|---|---|
| 6,654,957 B1* | 11/2003 | Moore et al. | 725/111 |
| 2004/0080768 A1* | 4/2004 | Larson | 358/1.13 |
| 2004/0252678 A1* | 12/2004 | Rabenko et al. | 370/352 |
| 2007/0110237 A1* | 5/2007 | Tehranchi et al. | 380/201 |
| 2008/0184090 A1* | 7/2008 | Kinoshita | 714/758 |
| 2009/0232112 A1* | 9/2009 | Trainin et al. | 370/337 |
| 2010/0098080 A1* | 4/2010 | Stacey | 370/392 |
| 2013/0094415 A1* | 4/2013 | Ling et al. | 370/311 |
| 2013/0125194 A1* | 5/2013 | Finkelstein et al. | 725/129 |
| 2013/0182623 A1* | 7/2013 | Fan et al. | 370/311 |
| 2014/0064297 A1* | 3/2014 | Hirota | 370/412 |
| 2015/0071283 A1* | 3/2015 | Hammond et al. | 370/390 |
| 2015/0071300 A1* | 3/2015 | Shallow et al. | 370/412 |
| 2015/0071302 A1* | 3/2015 | Hanna et al. | 370/429 |

* cited by examiner

SYSTEM AND METHOD FOR IMPROVED UPSTREAM TRANSMISSION

PRIORITY CLAIM

The present application claims the benefit of U.S. Provisional Patent Application Ser. No. 61/874,948, filed Sep. 6, 2013, which application is incorporated herein by reference in its entirety.

RELATED APPLICATION DATA

This application is related to the U.S. patent application Ser. No. 14/025,749 entitled HARDWARE IMPLEMENTED ETHERNET MULTIPLE TUPLE FILTER SYSTEM AND METHOD, filed Sep. 12, 2013, and application Ser. No. 14/025,607 entitled SYSTEM AND METHOD FOR EFFICIENT UPSTREAM TRANSMISSION USING SUPPRESSION, filed Sep. 12, 2013 and which are incorporated herein by reference in their entireties.

BACKGROUND

Data Over Cable Service Interface Specification (DOCSIS) is an international telecommunications standard that details various aspects of providing and handling high-speed data transfer using cable TV (CATV) systems that employ coaxial cabling as a medium of transmission. DOCSIS is followed by many cable television operators to provide Internet access over existing proprietary cable system infrastructure. Further, the DOCSIS standard allows for many variations within systems for accomplishing data communications so long as the standard is met. As a result, many devices may employ vastly different mechanisms and algorithms for accomplishing data communication all within the standards of DOCSIS.

A typical system architecture includes two primary components: a cable modem (CM) located at a local location (e.g., a consumer home), and a cable modem termination system (CMTS) located at a central location (e.g., a company's head end facility). A typical CMTS device hosts downstream and upstream ports such that data communication from the CMTS to the CM (downstream) and data communication from the CM to the CMTS (upstream) may be facilitated by the CMTS. Since downstream communication (e.g., delivery of cable content and the like) is typically the more prevalent form of data communications between the CMTS and CM, more transmission resources are dedicated to downstream communications. This results in upstream communication being more bandwidth limited due to its less prevalent nature. As a result, upstream communications tend to have less bandwidth allocated when compared to downstream communications. This is exacerbated by systems that share the same coaxial cable for both upstream and downstream communications. Thus, bandwidth allocated for upstream communications becomes bandwidth limited and therefore efficiency of upstream data communication becomes a laudable goal of any DOCSIS system.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

Figure 1:
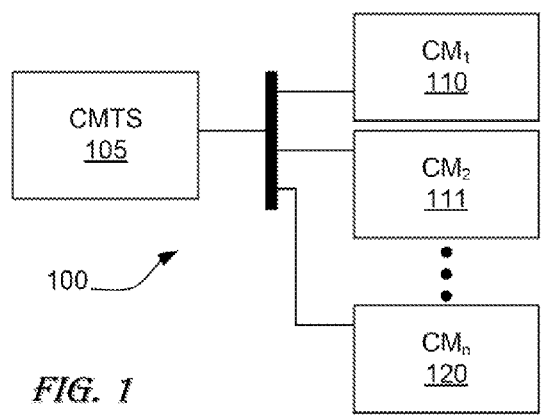
FIG. 1 is a block diagram of a cable communication system according to an embodiment of the subject matter disclosed herein.

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein may be directed to a system and method for improving upstream data communication from a local device coupled to a network through a local cable modem (or other networked device) to a server through central head end device. As is typical, in systems with such an arrangement, upstream communications to the server are controlled by granting permission to transmit in response to requests to transmit from various local devices. Further, the server only allocates a specific amount of time/bandwidth in response to each upstream data request. Therefore, it becomes more efficient to ensure that the device needing to transmit upstream data is ready to do so as soon as permission is granted.

According to an embodiment disclosed herein, a cable modem suited for improved upstream data transmission includes a transceiver configured for transmitting data upstream once permission is granted. In between times when permission to transmit is granted, however, the cable modem is configured to prepare as much data as possible for immediate upstream transmission once that very permission is granted. Thus, prior to permission being granted, the cable modem assembles (pre-processes) the data into transmit frames such that the data frames may be stored in a local memory coupled to the transceiver in a "ready-to-go" format. Such a ready-to-go format includes header data, encryption data, payload suppression data, and any other data typically associated with frames produced for a switched packet network. The cable modem includes a controller coupled to the transceiver and configured to store data in the memory prior to transmission, with the data stored in a format ready for transmission. When the server then grants bandwidth for upstream transmission, the cable modem need only provide a starting address in the memory of the first data frame ready for transmission and the size of the block of data frames that have been already pre-processed. In this manner, the entire amount of time/bandwidth allocated to the cable modem in response to its request for upstream data transmission may be dedicated to actually transmitting data upstream as opposed to consuming time and bandwidth processing the data into data frames after upstream data transmission has been granted. By pre-processing the data and storing it in a ready to go format in a memory, the cable modem may maximize its use of the allotted bandwidth from the server. These and other aspects of the systems and methods described herein are done so in conjunction with FIGS. 1-4 in the remainder of this disclosure.

FIG. 1 is a block diagram of a cable communication system 100 according to an embodiment of the subject matter disclosed herein. In this system, a CMTS 105 may be located at a cable company facility (often referred to as the head end). Such a CMTS 105 is used to establish downstream and upstream data communication to and from various CMs located at various customer residences and the like. Thus, in FIG. 1, one CMTS 105 may be dedicated to serve n customers, each having one CM ($CM_1$, $CM_2$, . . . $CM_n$) located at the customer residence. In some embodiments, a single customer may have more than one CM, but the ownership status of the CMs are not relevant to the systems described herein.

As such, content, such as television channel transmissions, pay-per-view transmissions and the like may be delivered to the various CMs ($CM_1$, $CM_2$, . . . $CM_n$) in downstream communications and requests for content and delivery of content back to the CMTS 105 may be delivered to the CMTS 105 from one or more CMs ($CM_1$, $CM_2$, . . . $CM_n$) in upstream communications.

Typically, the relationship of one CMTS to many coupled CMs means that resources at the CMTS are weighted toward providing data to the CMs in a data flow direction referred to as downstream transmission. That is, the majority of the data being communicated between the CMTS and any CM involves the delivery of content to the CM at the residential customer site, e.g., downstream transmissions. When any CM, however, needs to transmit data to the CMTS (for example, requesting content delivery or upload to content to a server location, or the like), the CM may typically need to request transmission permission from the CMTS for upstream transmission. Because a majority of the bandwidth allotted to the communication link is weighted toward downstream transmission, upstream transmission bandwidth is limited. Therefore, to be efficient and take advantage of the limited bandwidth available for upstream transmission, a method referred to as direct burst processing may be implemented to improve the efficiency of upstream transmission.

As is discussed in further detail below, a direct bursting processing mechanism may be implemented whereby prior to transmission time, upstream data is pre-processed to build appropriate data frames such that the data frames are then contiguously stored in a memory in a ready-to-go format. Then, when upstream transmission permission is granted, a burst is generated by pointing to a start address in the memory and a length associated with the block of data frames that are ready in the store memory. Multiple frames and possible fragments can hence be transmitted in one burst at a very high rate given that there is no need for any on-the-fly per packet scanning/processing.

Figure 2:
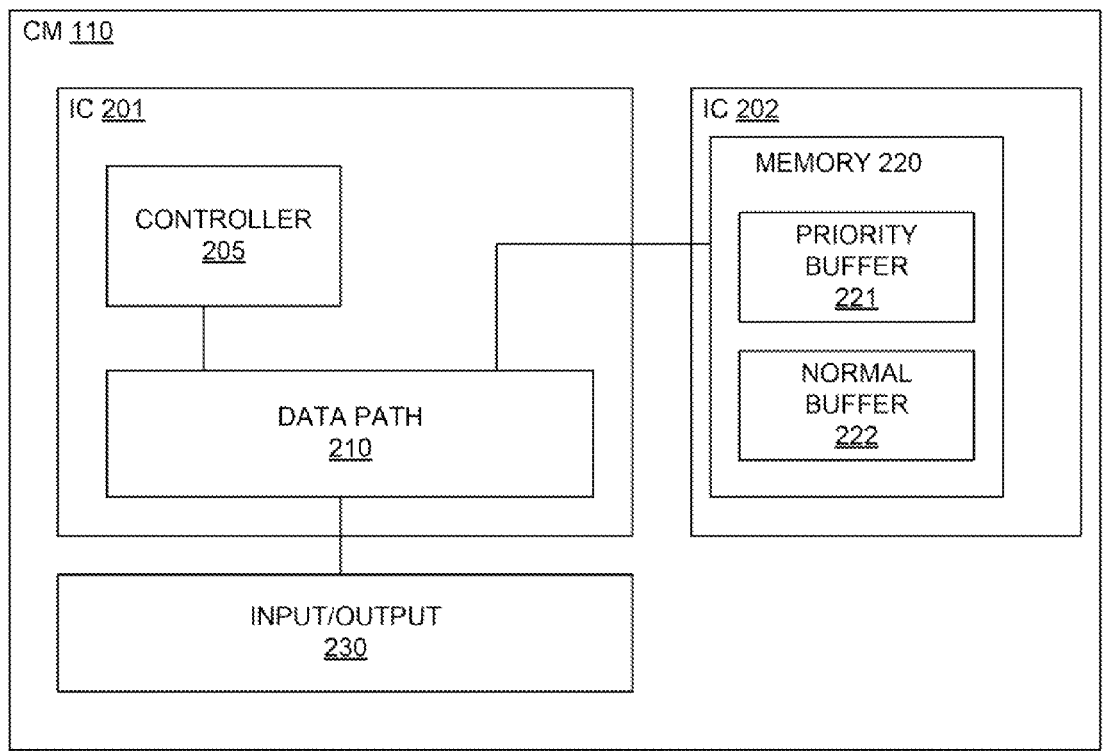
FIG. 2 is a block diagram of a device having improved upstream transmission according to an embodiment of the subject matter disclosed herein.

FIG. 2 is a block diagram of a device having improved upstream transmission according to an embodiment of the subject matter disclosed herein. The device may typically be a cable modem 110 or set top box as shown within the system of FIG. 1. In other embodiments, the device may be any manner of computing device including a personal computer or server computer. In this embodiment, one or more integrated circuits 201 and 202 may be used to implement the various electronic functionalities as described herein. Each integrated circuit 201 and 202 may be disposed on individual dies or may be disposed on the same circuit die. Further, each integrated circuit 201 and 202 may include electronic circuits disposed therein including processors, memory, input/output functionality and the like.

In FIG. 2, one integrated circuit 201 may be an upstream/downstream transceiver ("transceiver hereinafter") configured to facilitate both upstream data communication and downstream data communication between the CM 110 (e.g., the device itself) and a head end CMTS (not shown in FIG. 2). Typically, the CM may be coupled to a communication channel (e.g., a cable) or a communication network (e.g., the Hybrid Fiber and Coax) via an input/output module 230. Such a coupling may enable two-way communication such that both upstream and downstream communication is accomplished on the same physical connections. The protocols under which various communications may be accomplished are defined by DOCSIS.

The input/output module 230 may be coupled to the transceiver 201 such that data received in a downstream communication and data sent via an upstream communication is facilitated through a data path 210 controlled by a controller 205 at the transceiver 201. The data path 210 may typically include one or more logic blocks (e.g., hardware but not shown in detail) for handling data transfer and the controller 205 may typically include one or more processors that are configurable (i.e., programmable software, but also not shown in detail) for facilitating data transfer. Further yet, the device may include an additional integrated circuit 202 having a memory 220 for assisting with the burst processing by storing data packets ready for upstream transmission. The memory may be a double data rate (DDR) random-access memory (RAM) or any other form of usable memory. Further, the memory 220 may further include a priority buffer 221 that may be used to enable storage of high priority data frames marked for upstream transmission prior to the transmission of regular priority frames. Likewise, the memory 220 also may include a normal priority buffer 222 for storing data frames having normal priority to be distinguished from normal priority data frames.

The working relationships between the above-described components of the device are described further below with respect to FIGS. 3 and 4 and from the perspective of the transceiver 201.

Figure 3:
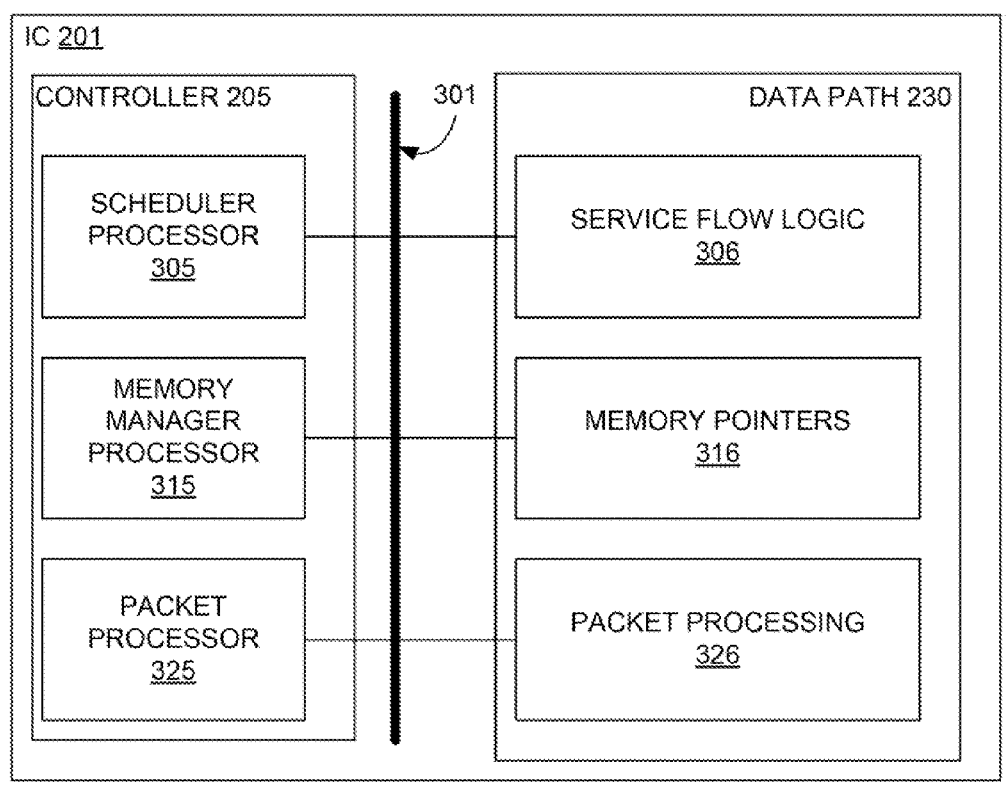
FIG. 3 is a block diagram of an integrated circuit having improved upstream communication according to an embodiment of the subject matter disclosed herein.

FIG. 3 is a block diagram of a transceiver 201 within an integrated circuit having improved upstream communication according to an embodiment of the subject matter disclosed herein. A skilled artisan understands that a typical transceiver 201 within a cable modem or other similar device handles both upstream data communication and downstream data communication. For the purposes of describing the improved upstream data communication disclosed herein, only the upstream data path and upstream components are described within the context of the transceiver 201.

The transceiver of FIG. 3 includes the controller 205 from FIG. 2, but depicts several processors within the context of a controller 205. It is understood that any distinction made between these various processors is simply for ease of discussion as any of the various configurations or tasks associated with any one processor may be accomplished by a single processor, a combination of processors, or individual processors as shown in FIG. 3. Thus, FIG. 3 shows a scheduler processor 305, a memory manager processor 315, and a packet processor 325.

Similarly, the transceiver of FIG. 3 includes the data path 230 from FIG. 2, but depicts several logic blocks within the context of a data path 230. It is also understood that any distinction made between these various logic bocks is simply for ease of discussion as any of the various configurations or tasks associated with any one logic block may be accomplished by a single logic block, a combination of logic blocks, or individual logic blocks as shown in FIG. 3. Thus, FIG. 3 shows service flow logic 306, memory pointers 316, and packet processing 326. Finally, each of the processors and logic blocks shown in FIG. 3 may be coupled to a common communication bus 301.

Further, there may be additional logical data paths associated with a particular service flow. Generally speaking, the transceiver 201 may coordinate the communication of data between various logical entities associated with the CM such that multiple communication sessions (commonly referred to as service flows) may be conducted in parallel. In the context of the remaining disclosure, a single service flow is discussed though it is understood that the methods and processes described may apply redundantly and in parallel for additional service flows.

When data is to be transmitted (upstream) from the CM to the CMTS, a convenient and universal standard (such as one defined within DOCSIS) for accomplishing such data communication involves using data packets that store both information about the data to be transmitted as well as the origin and type of data being transmitted. Thus, when data is to be transmitted upstream, it is first "pre-processed" to place the data into suitable "data packets" or frames for transmission. Such pre-processing includes appending additional meta data to the data to be transmitted that includes header information regarding the physical associations of the data source and the data path taken (outside of the transceiver). Other appended data includes encryption data, payload header suppression (PHS) data, and cyclic redundancy check codes (CRCs). Data packets are classified per service flow and are handled at various times during the procedures by different logical blocks and processors as briefly described above. In the following paragraphs, the tasks associated with each logic block and processor tandem are discussed in greater detail.

Generally, the transceiver 201 will include a packet processor 325 configured to coordinate and control a packet processing logic block 326. When an upstream data transmission is invoked, data packets are prepared and joined together to form data frames and then stored in a memory awaiting transmission as a ready-to-go data frame prior to the transceiver 201 receiving permission for upstream transmission. In the past, the frames were prepared during the period for upstream data transmission—that is after permission for upstream data transmission is granted. As a result, precious upstream data transmission time (e.g., clock cycles) was used simply to prepare the data for transmission. This is inefficient and wasteful in terms of optimum use of limited bandwidth. Thus, the preparation of data frames via the packet processing logic block 326 is accomplished to populate a buffer (memory 220 of FIG. 2) with ready-to-go data frames such that when permission for upstream transmission is granted, the entire bandwidth may be dedicated to sending the ready-to-go data frames stored in the memory 220.

After assembly of data frames for storage in the memory 220, the memory manager processor 315 coordinates and control the actual storage of the frames in the memory 220. As discussed briefly above, the memory 220 may include one or more independent memory buffers for storing the pre-processed data frames for each service flow. In one embodiment, the memory 220 includes more than one buffer. Thus, a priority buffer 221 may be used to enable storage of high priority data frames marked for upstream transmission prior to the transmission of regular priority frames. Likewise, the memory 220 also may include a normal priority buffer 222 for storing data frames having normal priority to be distinguished from high priority data frames.

When storing the pre-processed data frames in the memory 220, hardware logic 316 associated with the memory manager processor 315 may be used to manipulate the data frames using a number of byte pointers for managing the frames stored. The byte pointers (not shown individually) include registers that track memory addresses for received, requested, granted and transmitted data frames for each buffer (e.g., high priority buffer 221 and normal buffer 222). These byte pointers are able to be interpreted to maintain a set of linked lists to track frame positions within buffers.

Thus, as the last transmitted data frame is known (because of the address that the transmitted byte pointer indicates), one can then know that the next address for the next data frame is the first data frame in a next block of data frames to be transmitted. By incrementing the received byte pointer each time a new data frame is placed in a buffer, one can know the current size of the block of data frames ready for transmission. Similarly, the requested and granted byte pointers reveal the size of the block that may be transmitted during an allotment of time (e.g., bandwidth) granted from the CMTS. As data frames are placed into and transmitted from the memory 220, each of the byte pointers in the hardware logic 316 associated with the memory manager processor 315 is updated accordingly. The control of the flow of data frames out of the memory, however, is controlled by another processor as discussed further below.

Yet another processor used to control the device is a scheduler processor 305 that controls service flow logic 306 for upstream communication. During operation of the device, various upstream communications are generated by user actions and the like, such as request for content delivery, requests for subscriptions changes, etc. Thus, a scheduler processor 305 may keep track of data scheduled to be sent to the CMTS (upstream communication) and schedule the allocation of resources accordingly.

In terms of upstream communications, any CM needing to communicate upstream with the CMTS will request permission for bandwidth in order to send necessary data upstream. This may be accomplished though the scheduler processor 305 sending a request for upstream transmission. Such a request may be sent as soon as any data frame is ready and stored in the memory. In another embodiment, an upstream permission request is sent as soon as the CM determines that upstream communication will be needed. The aspects and inter-relationships of the components described with respect to FIG. 3 may be better understood with respect to the example method discussed below with respect to FIG. 4.

Figure 4:
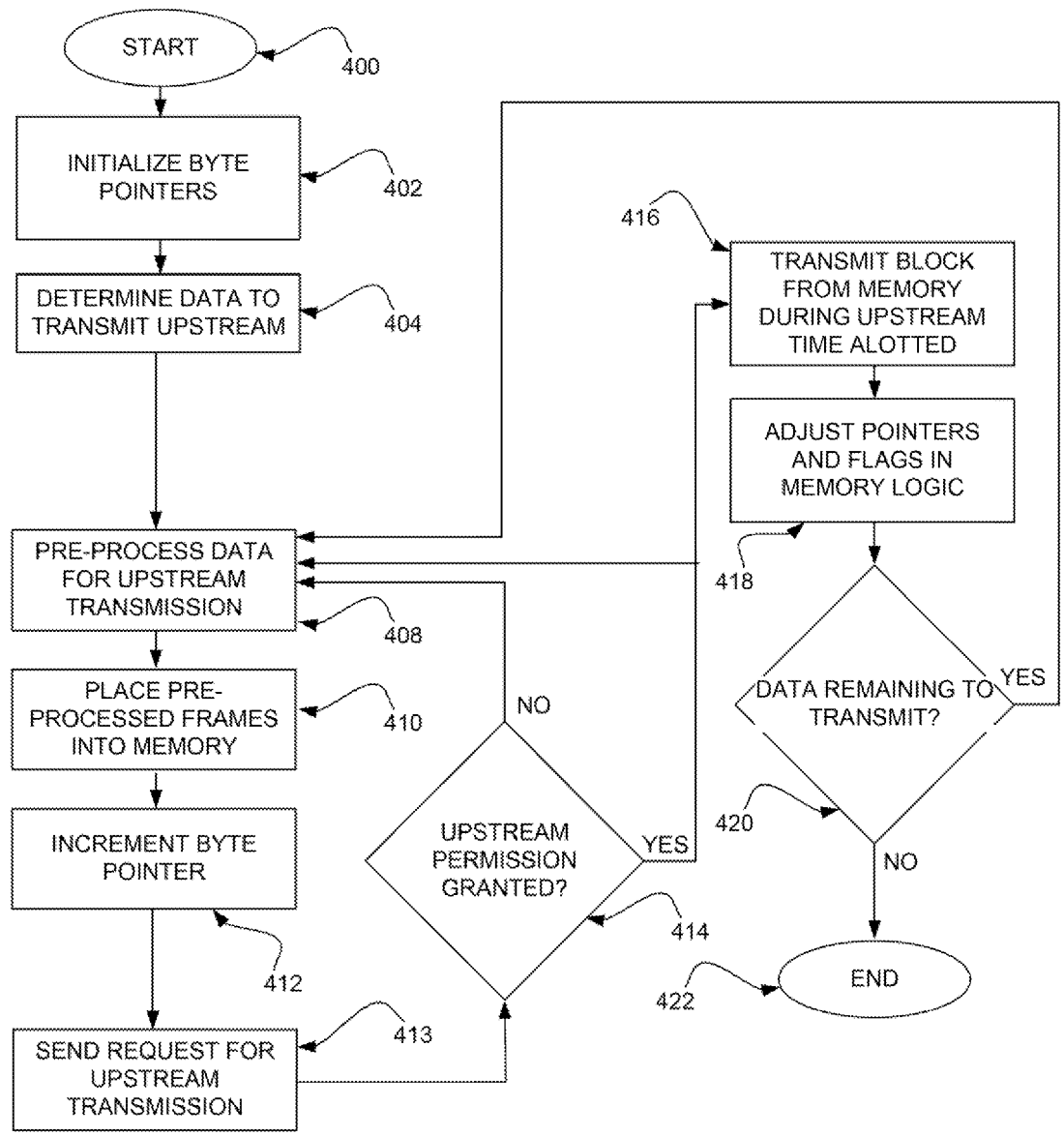
FIG. 4 is a flow chart of a method involved with the use of a system having improved upstream communication according to an embodiment of the subject matter disclosed herein.

FIG. 4 is a flow chart of a method involved with the use of a system having improved upstream communication according to an embodiment of the subject matter disclosed herein. The method may be accomplished by the systems and devices as described with respect to FIGS. 1-3.

In this embodiment, the method starts at 400 when a device, e.g., the CM, may be powered on wherein upstream communication may be needed. At step 402 all byte pointers are initialized such that as data frames that may be sent upstream may be pre-processed and stored in the memory ready for upstream transmission. Thus, the beginning address in the memory of the stored data frames is set as well as other parameters such as the block size of data frames ready to go. Thus, as an initial step, these byte pointers are initialized to a starting address by the memory manager processor 315 (FIG. 3).

Next, at step 404, an upstream communication may be called for during the operation of the CM.

Then, the actual data to be sent upstream is then pre-processed into data frames in an iterative manner starting at step 408. In this step, packet processing logic block 326 begins assembling the data to be sent upstream into data frames. Then, at step 410, packet processing logic block 326 in conjunction with the memory manager processor 315, stores the pre-processed frames in the memory. As each data frame is added to the memory, the received byte pointer is incremented, at step 412, to indicate that the block size of pre-processed data frames (e.g., ready-to-go) has increased by a data frame size (in bytes).

Further, at step 413, an upstream communications request may be sent to the CMTS such that bandwidth permission may be given. At this point, a decision block 414 may be encountered wherein it is determined if the CMTS has granted bandwidth yet. If so, then the "yes" branch is invoked whereby the actual transmission of data frames to the CMTS is carried out. Additionally, this branch also loops back to step 408 wherein additional data frames may continue to be pre-processed and stored in the memory (i.e., the loop between steps 408-410-412-413 and decision block 414). Similarly, if upstream communication permission has not yet been granted, the decision block 414 follows the "no" branch and still loops back to step 408 as just described.

Continuing on with the "yes" branch from decision block 414, the scheduler processor 305 may then begin transmission, at step 416 of pre-processed data frames stored in the memory. The beginning data frame may be indicated by the start address of the block of data frames that are ready (e.g., the address in which the transmitted byte pointer is pointing) and transmit all data frames that are ready to go (up to the received byte pointer) or maximum allowed data transmission during permission period (up to the granted byte pointer). As data frames are transmitted upstream, the appropriate byte pointers are adjusted accordingly by the memory manager processor 315 at step 418. Then at decision block 420, the method determines whether additional data frames remain for upstream transmission. If data frames are still stored in memory or waiting to be pre-processed for storage in memory, then the "yes" branch is invoked and the method again loops back to step 408 for additional data frame processing and storage. If there is no further data for upstream communication, the method takes the "no" branch from decision block 420 and may end at step 422. Or loop back to step 404 and await additional data to transmit upstream.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A device, comprising:
 a transceiver configured for transmitting data;
 a memory coupled to the transceiver and configured to store data to be transmitted;
 a controller coupled to the transceiver and configured to store data in the memory prior to transmission, and to manipulate the data in a format ready for transmission; and
 a logic block controllable by the controller and configured to produce the data into frames suited to the format; and
 the memory further configured to store a plurality of byte pointers for managing the manipulated data.

2. The device of claim 1, wherein the memory comprises a priority buffer configured for storing priority data and a non-priority buffer configured to store non-priority data.

3. The device of claim 1, wherein the format comprises data stored in frames suitable to be transmitted through a packet-switched network.

4. The device of claim 1, wherein the format comprises encryption data.

5. The device of claim 4, wherein the format comprises cyclic redundancy check data.

6. The device of claim 4, wherein the format comprises payload header suppression data.

7. The device of claim 1, wherein the controller comprises a processor.

8. The device of claim 1, wherein the controller comprises a processor for scheduling data transmission on a coupled network.

9. The device of claim 1, wherein the controller comprises a processor configured to store the data in the format in the memory in an order at a starting address.

10. The device of claim 1, wherein a respective byte pointer of the plurality of byte pointers is configured to indicate an address in the memory of the last known received data.

11. The device of claim 1, wherein a respective byte pointer of the plurality of byte pointers is configured to indicate an address in the memory of the last known data requested to be transmitted.

12. The device of claim 1, wherein a respective byte pointer of the plurality of byte pointers is configured to indicate an address in the memory of the last known data granted permission to be transmitted.

13. The device of claim 1, wherein a respective byte pointer of the plurality of byte pointers is configured to indicate an address in the memory of the last known transmitted data.

14. The device of claim 1, wherein the controller is configured to initiate a request for transmission in response to data being stored in the memory.

15. The device of claim 1, wherein the controller is further configured to initiate transmission of data stored in the memory in response to a permission grant from a remote device, the transmission including a burst of data that is stored in the memory.

16. The device of claim 1, wherein the device comprises one of a set top box, a cable modem, a personal computer, and a server computer.

17. A cable modem, comprising:
 a transceiver configured for transmitting data;
 a memory coupled to the transceiver and configured to store data to be transmitted;
 a controller coupled to the transceiver and configured to store data in the memory prior to transmission, the data in a format ready for transmission, and to transmit the data stored in the memory in response to a request for the data; and
 the memory further configured to store a byte pointer to indicate an address in the memory for the data to be transmitted.

18. An integrated circuit, comprising:
 a memory;
 a first logic block configured to manipulate data into data frames;
 a second logic block configured to store data frames in the memory in a transmission order;
 a third logic block configured to manage the memory storage via a plurality of address pointers; and
 a controller coupled to each logic block and configured to control each logic block and to transmit the data frames stored in the memory in response to a request for the data in the data frames.

19. The integrated circuit of claim 18, further comprising a single integrated circuit die on which are disposed the first logic block, the second logic block, the third logic block, and the controller.

20. The integrated circuit of claim 18, further comprising first and second integrated circuit die, wherein the controller is disposed on the first integrated circuit die and the memory is disposed on the second integrated circuit die.

21. A system, comprising:
 a cable modem, including:
  a transceiver configured for transmitting data and receiving data;
  a memory coupled to the transceiver and configured to store data to be transmitted; and
  a controller coupled to the transceiver and configured to store data in the memory prior to transmission, the data in a format ready for transmission, and to transmit the data stored in the memory in response to a request for the data, the memory further configured to store a byte pointer to indicate an address in the memory for the data to be transmitted; and
 a cable modem termination device coupled to the cable modem through a cable network and configured to transmit data to the cable modem and receive data from the cable modem when permission is granted.

22. A method, comprising:
 processing data into a transmission format for transmission prior to receiving a permission to transmit;
 storing the processed data in a memory in a transmission order;
 transmitting the data from the memory in response to the permission to transmit being granted; and
 maintaining byte pointers indicating a memory address for last known received data, last known data requested to be transmitted, last known data granted permission to be transmitted, and last known transmitted data.

23. The method of claim 22, wherein the processing further comprises storing the data in a data frame having header information, cyclic redundancy check data, payload header suppression data, and encryption data.

24. The method of claim 22, further comprising:
 storing data designated to be high priority data in a first portion of the memory designated for high priority data; and
 storing data designated to be non-priority data in a second portion of the memory designated for non-priority data.

25. The method of claim 22, wherein the permission to transmit is granted from a remote location.

26. The method of claim 22, wherein the permission to transmit further comprises a length of time.

27. The method of claim 22, wherein the permission to transmit further comprises a bandwidth.

* * * * *